June 24, 1924.
R. J. JAUCH
1,498,732
AUTOMATIC FEEDER FOR SOAP CUTTING TABLES
Filed May 12, 1923     2 Sheets-Sheet 1
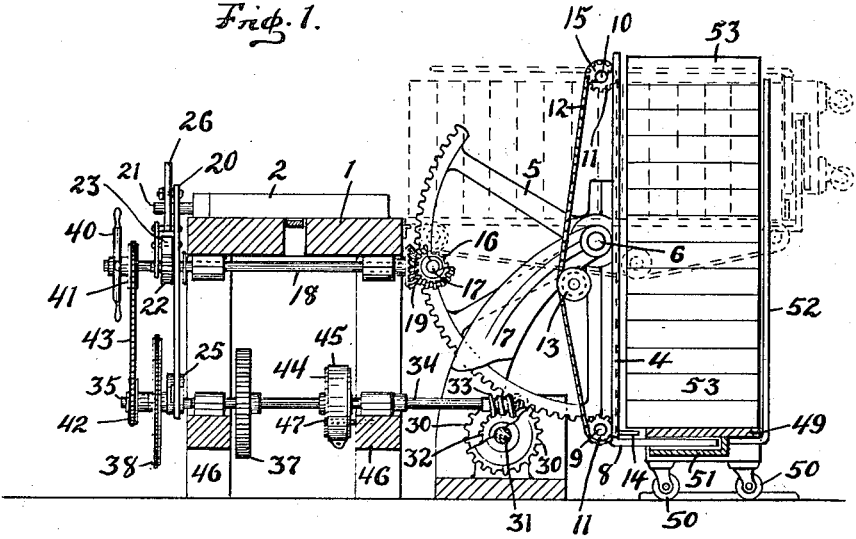
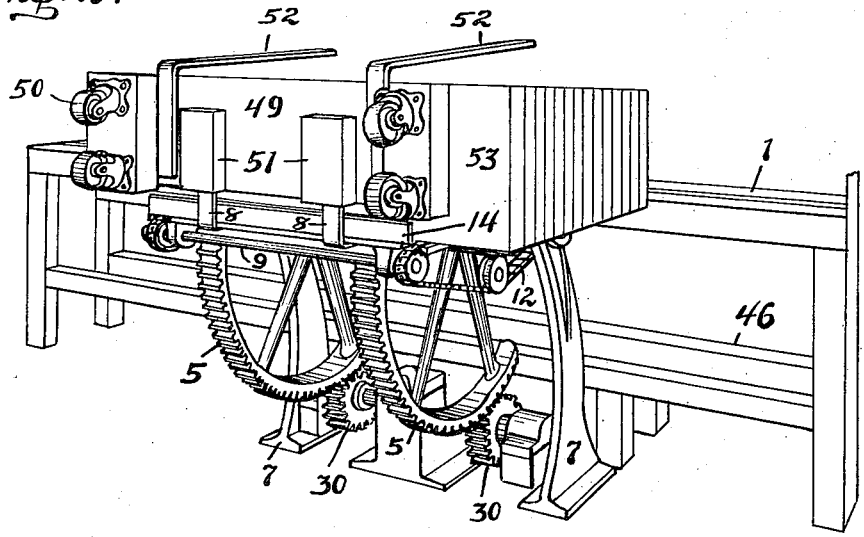
INVENTOR
Robert J. Jauch
BY
A. G. Burns ATTORNEY June 24, 1924.
R. J. JAUCH
AUTOMATIC FEEDER FOR SOAP CUTTING TABLES
Filed May 12, 1923
1,498,732
2 Sheets-Sheet 2
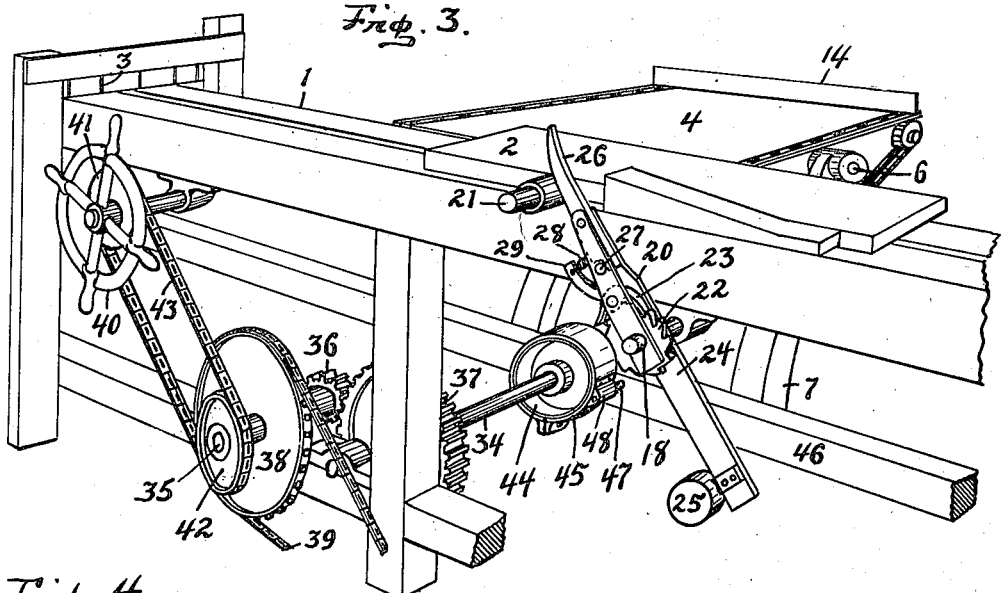
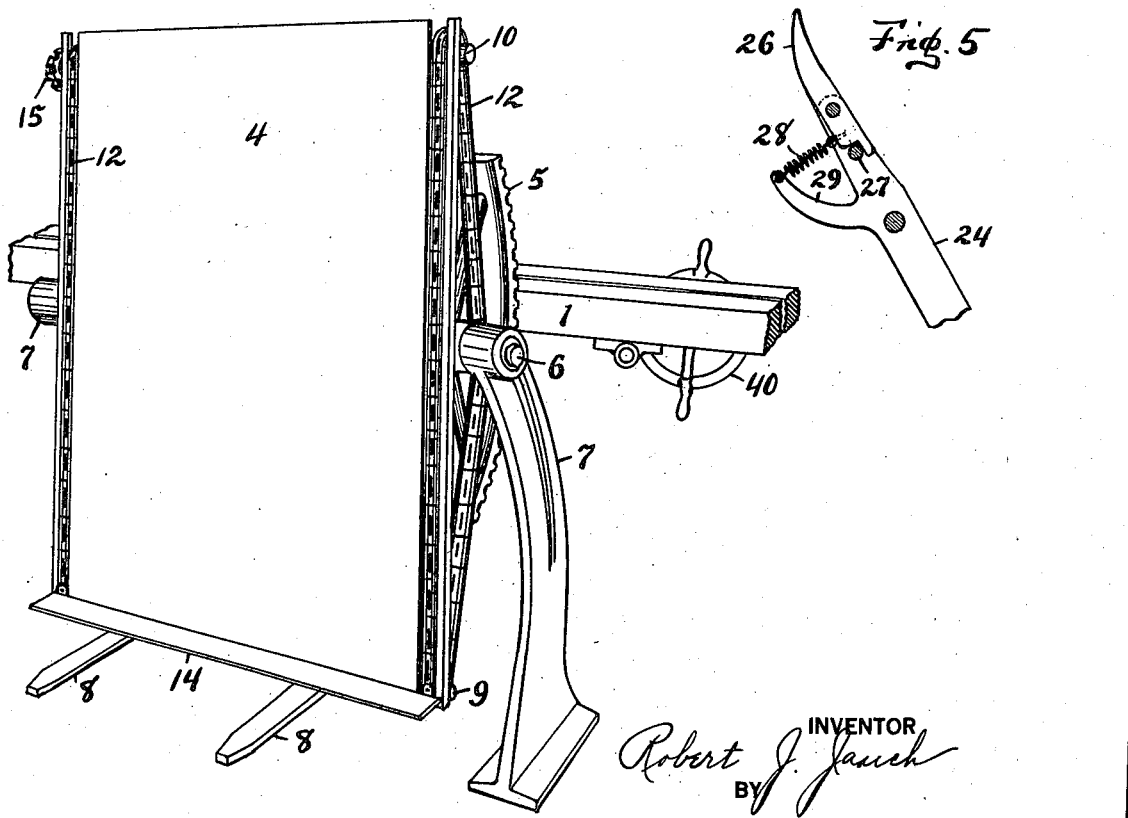
Robert J. Jauch INVENTOR
BY
H. G. Burns ATTORNEY Patented June 24, 1924.

1,498,732

UNITED STATES PATENT OFFICE.

ROBERT J. JAUCH, OF FORT WAYNE, INDIANA.

AUTOMATIC FEEDER FOR SOAP-CUTTING TABLES.

Application filed May 12, 1923. Serial No. 638,577.

*To all whom it may concern:*

Be it known that I, ROBERT J. JAUCH, a citizen of the United States of America, and resident of Fort Wayne, in the county of Allen and State of Indiana, have invented certain new and useful Improvements in Automatic Feeders for Soap-Cutting Tables, of which the following is a specification.

This invention relates to improvements in automatic feeders for soap cutting tables, especially for delivering to the cutting table slabs of soap from a portable truck upon which they are stacked and transported to the feeder.

It has been the custom in the ordinary practice to manually remove the slabs of soap from the loaded truck to the cutting machine which entails hard labor and frequently mutilates slabs to such an extent that portions thereof passing through the cutting machine are defective so that it is necessary to dispose of them as culls. The object of the present invention is to provide a mechanical means of transferring slabs of soap from a truck upon which they are transported to the machine, and depositing them in successive order onto the receiving table of a cutting machine without impairment of the slabs.

This object is accomplished by the construction illustrated in the accompanying drawings, in which:—

Fig. 1 is an end elevation of a construction embodying the invention and shown in connection with the receiving table of a cutting machine, there being parts in section;

Fig. 2 is a perspective rear view of the feeder supporting a truck load of soap slabs in position for the progression of the slabs onto the receiving table;

Fig. 3 is a fragmentary perspective side view of a soap cutting table with the present invention applied thereto, the tilting table being shown in horizontal position;

Fig. 4 is a similar view showing the tilting table as it appears from the rear side when in vertical position for receiving the truck; and Fig. 5 is a detail view of the ratchet mechanism for the feeder.

The characters appearing in the description refer to parts shown in the drawings and designated thereon by corresponding characters.

The soap cutting machine shown in the drawings may be of any suitable type provided with a receiving table 1 and a reciprocating plunger 2 longitudinally movable thereon for moving the soap slabs as they are laid upon the table into engagement with the cutting wires 3 in the usual manner.

The present invention comprises a tilting table 4 that is mounted upon a pair of segmental gear castings 5 which are supported on a shaft 6, the ends of which have bearing in a pair of brackets 7. The table is movable with the segmental gears as they turn with the shaft and thus the table may be positioned either vertically or horizontally according to the position of the gear segments. At one end of the table are fixed a pair of brackets 8 that project horizontally from the lower end of the table when the table is in vertical position. At each end of the table is supported a horizontally disposed shaft 9 and 10 respectively. Each shaft has fixed thereon a pair of sprocket wheels 11 for the support of corresponding endless chains 12. An idler 13 is also provided for each chain for taking up its slack. To each chain is attached a horizontally disposed feed-bar 14 that is moved over the surface of the table from one end to the other thereon by the action of the chains. The chains are actuated simultaneously by the rotation of the shaft 10 which is provided at one end with a pinion 15 that is moved into mesh with another pinion 16 when the table is positioned horizontally and is driven thereby. The driving pinion 16 is fixed on a counter-shaft 17 which is rotated by a drive-shaft 18 through the medium of a pair of bevel gears 19 and the drive-shaft is rotatively progressed periodically by means of a ratchet mechanism 20 which has operative relation with the plunger 2 on the cutting machine during the last stage of the retracting movement of the plunger, there being a laterally projecting stud 21 on the plunger that engages the ratchet mechanism.

The ratchet mechanism 20 comprises a ratchet wheel 22 fixed on the drive shaft 18, and a pawl 23 pivoted in a swinging member 24 that is loosely mounted upon the drive-shaft. At the lower end of the swinging member is attached a weight 25, and in the upper end of said member is a pivotally supported finger 26 that is engaged by the stud 21 and through which swinging movement is imparted to said member 24. A stop 27 in the swinging member acts to limit the pivotal movement of the finger 26 in one direction by engagement with the lower end thereof, and a tension spring 28 has connection with a branch 29 on the member and the lower part of the finger so that the finger is thereby held in normally operative position against the stop.

The segment gears 5 are actuated by gears 30 respectively that are fixed on a shaft 31 upon which is also fixed a worm gear 32, and movement is imparted to the worm gear by a worm 33 on a drive-shaft 34. Movement is imparted to the drive-shaft 34 by a countershaft 35 having a pinion 36 that meshes with the gear wheel 37 on the drive-shaft, and the counter-shaft 35 has a sprocket wheel 38 that is actuated by a drive chain 39 which is intended for connection with an electric motor (not shown) or other suitable source of power. The countershaft 35 is also manually operable through the medium of a hand-wheel 40 and the pair of sprocket wheels 41 and 42 which are connected by an endless chain 43.

As a means to prevent inert movement of the tilting table, a wheel 44 is fixed on the drive-shaft 34, and a friction band 45 is mounted on the wheel and anchored to the frame 46 of the cutting machine by means of a stud 47, there being a lug 48 attached to the band into which the stud extends. The band is sufficiently tight upon the wheel as to frictionally restrain momentum action of the drive-shaft.

In operating the invention a truck is utilized consisting of a platform 49 mounted upon casters 50 and having fixed beneath the platform a pair of sockets 51 that are open at one side of the platform for the reception of the brackets 8 that extend from the tilting table. A pair of vertically disposed stakes 52 extend upwardly from that side of the platform of the truck opposite the sockets.

Upon the truck is loaded a stock of soap prepared in slabs 53 arranged horizontally in vertical succession, and while the tilting table is in vertical position the loaded truck is positioned so that the brackets 8 extend into its sockets. The tilting table is then turned to its horizontal position by turning on the power which actuates its driving mechanism. During this operation, the truck with its load is lifted bodily from the floor and the slabs of soap are deposited edgewise upon the tilting table when the latter reaches its horizontal position. As the plunger 2 of the cutting machine reciprocates, the ratchet mechanism is actuated and at the latter part of each backward stroke of the plunger the drive-shaft 18 is actuated and consequently the chains 12 are correspondingly progressed through the medium of the transmitting mechanism provided therefor, thus, the feed-bar 14 attached to the chains and extending upwardly behind the rearmost slab, is moved toward the receiving table of the cutting machine and the slabs are thereby forcibly moved upon the tilting table, at each operation of the ratchet mechanism, so that the foremost slab on the tilting table is deposited on the receiving table of the cutting machine while the plunger is in its rearmost position. When thus deposited, the slab is manually thrown over flatwise onto the receiving table ahead of the plunger and is carried forward by the plunger in the usual manner into the cutting machine. Upon the return stroke of the plunger the ratchet mechanism is again actuated and the succeeding slab of soap is consequently deposited on the receiving table as in the former instance. When all of the slabs have been thus disposed of the tilting table is returned to its vertical position by its actuating mechanism, and thus the empty truck is returned to its position on the floor where it may be removed and replaced with a loaded truck.

It is the intention in operating the invention to turn off the power by which the table is tilted before it reaches the completion of its movement, and then by manipulating the hand-wheel, the tilting table may be gradually brought to a stop under manual control.

What I claim is:—

1. In a feeder for soap cutting machines having a receiving table and reciprocating plunger thereon, a tilting table; a reciprocating mechanism on the tilting table including a feed-bar movable reciprocally from one end of the table to the other; a driving mechanism for tilting the table; a friction detent means for the driving mechanism; a ratchet actuated mechanism operable by enagement with the plunger of the cutting machine and having connecting and actuating engagement with the tilting table when the tilting table is in horizontal position; a movable truck; and means in connection with the truck and the tilting table for their engagement.

2. In feeding mechanism for a machine having a receiving table and reciprocating member thereon, a tilting table including mechanism for positioning it in vertical and horizontal planes; a feeding mechanism including a feed-bar reciprocally movable from one end of the table to the other; a mechanism periodically operable by said reciprocating member for imparting movement to said feeding mechanism when the tilting table is in horizontal position; and means attachable to the tilting table when in vertical position for supplying material to said table.

3. In feeding mechanism for a machine having a receiving table and plunger reciprocable thereon, a movable feed table including mechanism for actuating it; a feeding mechanism including a feed-bar reciprocally movable on the feed table: a mechanism operable by said plunger for imparting movement to said feeding mechanism; and means attachable to the feed table for supplying material thereto.

4. In combination with a supply truck, a tilting feed table including mechanism for positioning it in different planes; means in connection with the tilting table for engagement with the truck so that the truck will be lifted when the table is tilted and its load deposited thereon; a feed bar reciprocally movable on the table; and a mechanism for actuating said feed-bar.

5. In mechanism for unloading a truck and feeding the load to an operating machine, a tilting table including mechanism for positioning it in vertical and horizontal planes: means in connection with the tilting table for engaging the truck when the table is in vertical position so that the truck will be lifted when the table is tilted to horizontal position and its load deposited on the table; a feeding mechanism on the tilting table for periodically progressing the load from the table onto the operating machine; and a mechanism co-operable with the operating machine for actuating the feeding mechanism.

6. In feeding mechanism for operating machines, a tilting table including mechanism for positioning it in vertical and horizontal planes; a truck having engaging relation with the tilting table when in vertical position so that the truck will be lifted and its load deposited upon the table when the table is moved to its horizontal position; a feeding mechanism on the table for periodically progressing the load deposited thereon onto the operating machine; and a mechanism in connection with the operating machine attachable to said feeding mechanism on the tilting table for actuating the same when the tilting table is in horizontal position.

In testimony whereof I affix my signature in presence of two witnesses.

ROBERT J. JAUCH.

Witnesses:
MATILDA METTLES,
WALTER G. BURNS.